(12) United States Patent
Hiura

(10) Patent No.: US 11,225,572 B2
(45) Date of Patent: *Jan. 18, 2022

(54) WATER-SOLUBLE FILM AND CHEMICAL AGENT PACKAGE

(71) Applicant: MITSUBISHI CHEMICAL CORPORATION, Tokyo (JP)

(72) Inventor: Takahiro Hiura, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 33 days.

This patent is subject to a terminal disclaimer.

(21) Appl. No.: 16/451,342

(22) Filed: Jun. 25, 2019

(65) Prior Publication Data

US 2019/0322855 A1    Oct. 24, 2019

Related U.S. Application Data

(63) Continuation of application No. PCT/JP2017/046200, filed on Dec. 22, 2017.

(30) Foreign Application Priority Data

Dec. 27, 2016 (JP) .............................. JP2016-253450

(51) Int. Cl.
*C08L 29/04* (2006.01)
*C08K 5/053* (2006.01)
*C11D 17/00* (2006.01)
*C11D 17/04* (2006.01)

(52) U.S. Cl.
CPC .............. *C08L 29/04* (2013.01); *C08K 5/053* (2013.01); *C11D 17/043* (2013.01); *C08L 2203/16* (2013.01)

(58) Field of Classification Search
USPC ....................................................... 524/388
See application file for complete search history.

(56) References Cited

U.S. PATENT DOCUMENTS

| | | | |
|---|---|---|---|
| 5,102,950 A | 4/1992 | Terada et al. | |
| 2004/0092635 A1 | 5/2004 | Kitamura et al. | |
| 2007/0276317 A1 | 11/2007 | Henderson et al. | |
| 2009/0110942 A1 | 4/2009 | Henderson-Rutgers et al. | |
| 2010/0297458 A1 | 11/2010 | Khemani et al. | |
| 2011/0186467 A1 | 8/2011 | Denome et al. | |
| 2014/0199460 A1 | 7/2014 | Lee et al. | |
| 2016/0280869 A1 | 9/2016 | Nii et al. | |
| 2017/0233539 A1 | 8/2017 | Friedrich et al. | |
| 2017/0298216 A1 | 10/2017 | Labeque et al. | |
| 2019/0284356 A1* | 9/2019 | Hiura | C08J 5/18 |

FOREIGN PATENT DOCUMENTS

| | | |
|---|---|---|
| CN | 105188403 A | 12/2015 |
| EP | 0354410 A2 | 2/1990 |
| EP | 1251147 A1 | 10/2002 |
| EP | 1418196 | 5/2004 |
| JP | 2001-329130 | 11/2001 |
| JP | 2002-241797 A | 8/2002 |
| JP | 2004-161823 | 6/2004 |
| JP | 2008-516016 | 5/2008 |
| JP | 2008-517108 | 5/2008 |
| JP | 2009-545658 | 12/2009 |
| JP | 2013-518173 A | 5/2013 |
| WO | 2006/042364 A1 | 4/2006 |
| WO | 2011/094470 | 8/2011 |
| WO | 2016/61026 | 4/2016 |
| WO | WO 2016/160116 A1 * | 10/2016 ............. C08K 5/053 |

OTHER PUBLICATIONS

Glycerol—www.inchem.org/documents/icsc/icsc/eics0624.htm (Year: 2006).*
Sorbitol—www.inchem.org/documents/icsc/icsc/eics0892.htm (Year: 2002).*
1,1,1-Trimethylolpropane—www.inchem.org/documents/icsc/icsc/eics0366.htm (Year: 2005).*
Chemical Book: Maltitol Properties—https://www.chemicalbook.com/ChemicalProductProperty_EN_CB8726683.htm (Year: 2017).*
Mannitol/C6H14O6—PubChem—https://pubchem.ncbi.nlm.nih.gov/compound/Mannitol#section=Information-Sources (Undated).*
Chemical Book: Adonitol Product Description—https://www.chemicalbook.com/ChemicalProductProperty_US_CB2386289.aspx (Year: 2017).*
Isomalt—LookChem.com—https://lookchem.com/Isomalt/ (Year: 2008).*
Chemical Book: Xylitol Properties—http://www.chemicalbook.com/ChemicalProduct Property_EN_CB4353243.htm (Year: 2017).*
Supplemental European Search Report issued in EP Patent App. No. 17888605.7 dated Dec. 19, 2019, English translation.
International Search Report issued in Patent Application No. PCT/JP2017/046200 dated Apr. 3, 2018, with English translation.
English translation of International Preliminary Report on Patentability issued in Patent Application No. PCT/JP2017/046200 dated Jul. 11, 2019.
ISR issued in WIPO Patent Application No. PCT/JP2017/046198, dated Mar. 13, 2018.
IPRP issued in WIPO Patent Application No. PCT/JP2017/046198, dated Jul. 11, 2019.

(Continued)

*Primary Examiner* — Fred M Teskin

(74) *Attorney, Agent, or Firm* — Greenblum & Bernstein, P.L.C.

(57) ABSTRACT

A water-soluble film includes: a polyvinyl alcohol resin (A); and a plasticizer (B), wherein the plasticizer (B) contains a polyhydric alcohol (b1) having a melting point of more than 50° C. and 100° C. or less, a polyhydric alcohol (b2) having a melting point of 50° C. or less, and a polyhydric alcohol (b3) having a melting point of more than 100° C. The water-soluble film has a high tensile strength and a high tensile elongation, and does not cause bleed-out before the formation of a package.

19 Claims, No Drawings

(56) References Cited

OTHER PUBLICATIONS

Supplemental European Search Report issued in EPO Patent Application No. 17887303.0, dated Dec. 16, 2019.
Office Action issued in Japanese Patent Application No. 2017-567281, dated Aug. 3, 2021, English translation.
Chinese Office Action, Chinese Patent Office, Application No. 201780080540.7, dated Jun. 9, 2021, English translation.

* cited by examiner

WATER-SOLUBLE FILM AND CHEMICAL AGENT PACKAGE

RELATED APPLICATION

This application is a continuation of International Application No. PCT/JP2017/046200, filed on Dec. 22, 2017, which claims priority to Japanese Patent Application No. 2016-253450, filed on Dec. 27, 2016, the entire contents of each of which being hereby incorporated by reference.

TECHNICAL FIELD

The present disclosure relates to a water-soluble film including a polyvinyl alcohol resin as a main component, and more specifically, to a water-soluble film that has excellent mechanical characteristics, such as a high tensile strength and a high tensile elongation, and that does not cause bleed-out before formation of a package, and a chemical agent package obtained by using the film.

A polyvinyl alcohol is hereinafter sometimes abbreviated as "PVA", and a water-soluble film including a polyvinyl alcohol resin as a main component is hereinafter sometimes abbreviated as "PVA water-soluble film" or simply as "water-soluble film".

BACKGROUND ART

A PVA film is a film formed of a PVA resin that has water solubility while being a thermoplastic resin, and the film is largely different from a hydrophobic film that is frequently used for a packaging film or the like in ordinary cases, such as a polyethylene terephthalate film or a polyolefin film, in, for example, various film physical properties and texture.

In addition, a chemical agent portion package (unit package) obtained by incorporating any one of various chemical agents, such as an agricultural chemical and a detergent, into a bag formed of a film of the PVA resin through the exploitation of the water solubility of the PVA resin has heretofore been proposed, and has been used in a wide variety of applications.

As a water-soluble unit packaging bag to be used in such applications, for example, there has been known a water-soluble film obtained by blending 100 parts by weight of a PVA with 5 parts by weight to 30 parts by weight of a plasticizer, 1 part by weight to 10 parts by weight of starch, and 0.01 parts by weight to 2 parts by weight of a surfactant (see, for example, PTL 1), or a water-soluble film formed of a resin composition containing 20 parts by weight to 50 parts by weight of a plasticizer, 2 parts by weight to 30 parts by weight of a filler, and 0.01 parts by weight to 2.5 parts by weight of a surfactant with respect to 100 parts by weight of an anionic group-modified PVA resin having a 4 wt % aqueous solution viscosity at 20° C. of from 10 mPa·s to 35 mPa·s, an average saponification degree of from 80.0 mol % to 99.9 mol %, and an anionic group modification amount of from 1 mol % to 10 mol % (see, for example, PTL 2).

RELATED ART DOCUMENT

Patent Document

PTL 1: JP-A-2001-329130
PTL 2: JP-A-2004-161823

SUMMARY

Each of the water-soluble films disclosed in PTL 1 and PTL 2 described above is excellent in water solubility and hence can be used as a chemical agent package having packaged therein a liquid detergent or the like. However, the plasticizer in the film bleeds out when the film is in the state of a film roll before the formation of the package, and the bleed-out causes a problem, such as the contamination of a package-forming apparatus or the whitening of the film, in some cases. Accordingly, a water-soluble film from which a plasticizer does not bleed out has been desired.

In view of the foregoing, under such background, according to the present disclosure, there are provided a water-soluble film that has excellent mechanical characteristics, such as a high tensile strength and a high tensile elongation, and that does not cause bleed-out before the formation of a package, and a chemical agent package obtained by packaging various chemical agents with the water-soluble film.

To provide such water-soluble film and chemical agent package, the inventor has made extensive investigations in view of such circumstances, and as a result, has found that, when three kinds of plasticizers having different melting points are used in combination as plasticizers in a water-soluble film including a PVA resin as its main component, a water-soluble film that has excellent mechanical characteristics, such as a high tensile strength and a high tensile elongation, and that does not cause bleed-out before the formation of a package can be obtained without the impairment of the water solubility of the film.

That is, the gist of the present disclosure relates to a water-soluble film, including: a PVA resin (A); and a plasticizer (B), wherein the plasticizer (B) contains a polyhydric alcohol (b1) having a melting point of more than 50° C. and 100° C. or less, a polyhydric alcohol (b2) having a melting point of 50° C. or less, and a polyhydric alcohol (b3) having a melting point of more than 100° C.

According to one embodiment of the present disclosure, there is also provided a chemical agent package, including: a package bag obtained by bonding the water-soluble films to each other; and a liquid chemical agent included in the package bag.

The water-soluble film of the present disclosure is a water-soluble film that has excellent water solubility, has excellent mechanical characteristics, such as a high tensile strength and a high tensile elongation, and does not cause bleed-out before the formation of a package. Accordingly, the film can be used in various packaging applications, and is particularly useful in an application where a chemical agent or the like is packaged as a unit.

In addition, when the water-soluble film of the present disclosure includes an anionic group-modified polyvinyl alcohol resin as the polyvinyl alcohol resin (A), its solubility in water further increases.

Further, when the water-soluble film of the present disclosure includes an anionic group-modified polyvinyl alcohol resin and an unmodified polyvinyl alcohol as the polyvinyl alcohol resin (A), its water sealability further increases.

In addition, when the content of the plasticizer (B) in the water-soluble film of the present disclosure is 25 parts by weight or more with respect to 100 parts by weight of the polyvinyl alcohol resin (A), the easy formability of the water-soluble film further increases.

In addition, when the content ratio (b1/b3) of the polyhydric alcohol (b1) having a melting point of more than 50° C. and 100° C. or less to the polyhydric alcohol (b3) having a melting point of more than 100° C. in the water-soluble film of the present disclosure is from 1 to 40 in terms of weight ratio, the bleed-out resistance of the film further increases.

When the water-soluble film has a water content of from 3 wt. % to 15 wt. %, the mechanical strength and sealability of the film further increases.

The chemical agent package including the package bag obtained by bonding the water-soluble films to each other and the liquid chemical agent included in the package bag serves as a suitable use form of the chemical agent because the chemical agent package holds such a shape as to include the liquid chemical agent therein at the time of its conveyance or storage, and is smoothly dissolved in water to diffuse the included chemical agent in the water at the time of its use. In addition, the chemical agent package is suitable as a package in which a chemical agent is individually packaged.

In addition, in the chemical agent package of the present disclosure, in the case where the liquid chemical agent shows a pH value of from 6 to 12 when dissolved or dispersed in water, and the liquid chemical agent has a water content of 15 wt. % or less, the films do not gel or become insoluble. Accordingly, the chemical agent package is more smoothly dissolved at the time of its use, and hence does not inhibit the diffusion of the liquid chemical agent.

DESCRIPTION OF EMBODIMENTS

The present disclosure is specifically described below. However, the following description describes an example of a desired embodiment of the present disclosure, and the present disclosure is not limited to its contents.

In the present disclosure, the term "(meth)acryl" means acryl or methacryl, and the term "(meth)acrylate" means an acrylate or a methacrylate.

A water-soluble film of the present disclosure includes a PVA resin (A) as a main component, and further includes a plasticizer (B). The term "main component" as used herein refers to a component accounting for more than half of the entirety of the film, and is meant to include a case in which the entirety is formed only of the main component. Of such cases, a case in which the PVA resin (A) is incorporated at 50 wt. % or more, in particular, 70 wt. % or more into the water-soluble film is more preferred.

First, the PVA resin (A) to be used in the present disclosure is described.

Examples of the PVA resin (A) to be used in the present disclosure include an unmodified PVA and a modified PVA resin.

The average saponification degree of the PVA resin (A) to be used in the present disclosure is preferably 80 mol % or more, particularly preferably from 82 mol % to 99.9 mol %, more preferably from 85 mol % to 98.5 mol %, still more preferably from 90 mol % to 97 mol %. In addition, when an unmodified PVA is used as the PVA resin (A), its average saponification degree is preferably 80 mol % or more, particularly preferably from 82 mol % to 99 mol %, more preferably from 85 mol % to 90 mol %. In addition, when a modified PVA resin is used as the PVA resin (A), its average saponification degree is preferably 80 mol % or more, particularly preferably from 85 mol % to 99.9 mol %, more preferably from 90 mol % to 98 mol %. Further, when an anionic group-modified PVA resin is used as the PVA resin (A), its average saponification degree is preferably 85 mol % or more, particularly preferably from 88 mol % to 99 mol %, more preferably from 90 mol % to 97 mold. When such average saponification degree is excessively small, the solubility of the water-soluble film in water tends to decrease with time depending on the pH of a chemical agent to be packaged. When the average saponification degree is excessively large, the solubility in water tends to be largely reduced owing to thermal history at the time of film formation.

The polymerization degree of the PVA resin (A) may be generally represented by an aqueous solution viscosity, and its 4 wt. % aqueous solution viscosity at 20° C. is preferably from 5 mPa·s to 50 mPa·s, particularly preferably from 13 mPa·s to 45 mPa·s, more preferably from 17 mPa·s to 40 mPa·s. In addition, when an unmodified PVA is used as the PVA resin (A), the 4 wt. % aqueous solution viscosity of the unmodified PVA at 20° C. is preferably from 5 mPa·s to 50 mPa·s, particularly preferably from 13 mPa·s to 45 mPa·s, more preferably from 17 mPa·s to 40 mPa·s. In addition, when a modified PVA resin is used as the PVA resin (A), the 4 wt. % aqueous solution viscosity of the modified PVA resin at 20° C. is preferably from 5 mPa·s to 50 mPa·s, particularly preferably from 13 mPa·s to 45 mPa·s, more preferably from 17 mPa·s to 30 mPa·s. When such viscosity is excessively low, the mechanical strength of the water-soluble film serving as a packaging material tends to be reduced. Meanwhile, when the viscosity is excessively large, the aqueous solution viscosity of the resin at the time of film formation is high, and hence the productivity of the film tends to be reduced.

The average saponification degree is measured in conformity with JIS K 6726 3.5, and the 4 wt. % aqueous solution viscosity is measured in conformity with JIS K 6726 3.11.2.

Examples of the modified PVA resin to be used in the present disclosure include an anionic group-modified PVA resin, a cationic group-modified PVA resin, and a nonionic group-modified PVA resin. Of those, the anionic group-modified PVA resin is preferably used in terms of the solubility of the water-soluble film in water. Examples of the kind of the anionic group include a carboxyl group, a sulfonic acid group, and a phosphoric acid group. Of those, the carboxyl group or the sulfonic acid group is preferred in terms of the chemical resistance of the film and the stability thereof with time, and a carboxyl group is particularly preferred.

In the present disclosure, the modification amount of the anionic group-modified PVA resin is preferably from 1 mol % to 10 mol %, particularly preferably from 2 mol % to 9 mol %, more preferably from 2 mol % to 8 mol %, still more preferably from 3 mol % to 7 mol %. When such modification amount is excessively small, the solubility of the resin in water tends to be reduced. When the modification amount is excessively large, the productivity of the PVA resin (A) tends to be reduced, or the biodegradability thereof tends to be reduced. In addition, the blocking of the water-soluble film tends to be liable to occur, and hence the practicality thereof is reduced.

In the present disclosure, the PVA resin (A) may be used alone. In addition, the unmodified PVAs may be used in combination, the modified PVA resins may be used in combination, or the unmodified PVA and the modified PVA resin may be used in combination. Further, for example, two or more kinds of PVA resins different from each other in saponification degree, viscosity, modifying group, modification amount, or the like may be used in combination.

In the present disclosure, the water-soluble film preferably contains the modified PVA resin as the PVA resin (A) because its solubility can be held for a long time period, and the film particularly preferably contains the anionic group-modified PVA resin, and more preferably contains a carboxyl group-modified PVA resin. In addition, the water-soluble film preferably contains both of the anionic group-modified PVA resin and the unmodified PVA in terms of a film strength, and the film particularly preferably contains the carboxyl group-modified PVA resin and the unmodified PVA.

The content ratio (modified PVA resin/unmodified PVA) of the modified PVA resin to the unmodified PVA is preferably from 95/5 to 60/40, particularly preferably from 94/6 to 70/30, more preferably from 93/7 to 80/20 in terms of weight ratio. When such content ratio is excessively small, the solubility of the water-soluble film in water tends to be reduced, and when the ratio is excessively large, the sealability thereof tends to be reduced.

In addition, when the modified PVA resin and the unmodified PVA are used in combination, the 4 wt. % aqueous solution viscosity of the unmodified PVA particularly at 20° C. is preferably from 5 mPa·s to 50 mPa·s, particularly preferably from 8 mPa·s to 45 mPa·s, more preferably from 12 mPa·s to 40 mPa·s, still more preferably from 15 mPa·s to 35 mPa·s. When such viscosity is excessively low, the mechanical strength of the water-soluble film serving as a packaging material tends to be reduced. Meanwhile, when the viscosity is excessively large, the aqueous solution viscosity of the resin at the time of film formation is high, and hence the productivity of the film tends to be reduced.

Next, the water-soluble film of the present disclosure is produced, for example, as described below.

The unmodified PVA may be produced by saponifying a vinyl ester polymer obtained by polymerizing a vinyl ester compound.

Examples of such vinyl ester compound include vinyl formate, vinyl acetate, vinyl trifluoroacetate, vinyl propionate, vinyl butyrate, vinyl caprate, vinyl laurate, vinyl versatate, vinyl palmitate, and vinyl stearate. Of those, vinyl acetate is preferably used. The vinyl ester compounds may be used alone or in combination thereof.

The modified PVA resin may be produced by, for example, a method involving copolymerizing the vinyl ester compound and an unsaturated monomer copolymerizable with the vinyl ester compound, and then saponifying the resultant copolymer, or a method involving post-modifying the unmodified PVA.

In the water-soluble film of the present disclosure, any one of the following unsaturated monomers copolymerizable with the vinyl ester compound may be copolymerized, but when the modified PVA resin is to be obtained, an unsaturated monomer having a modifying group out of the following unsaturated monomers needs to be copolymerized. Examples of the unsaturated monomer include: olefins, such as ethylene, propylene, isobutylene, α-octene, α-dodecene, and α-octadecene; hydroxy group-containing α-olefins, such as 3-buten-1-ol, 4-penten-1-ol, and 5-hexen-1-ol, and derivatives thereof, such as acylated products thereof; unsaturated acids, such as acrylic acid, methacrylic acid, crotonic acid, maleic acid, maleic anhydride, itaconic acid, and undecylenic acid, and salts, monoesters, or dialkyl esters thereof; amides, such as diacetone acrylamide, acrylamide, and methacrylamide; and olefin sulfonic acids, such as ethylenesulfonic acid, allylsulfonic acid, and methallylsulfonic acid, and salts thereof. Those unsaturated monomers may be used alone or in combination thereof. The content ratio of the copolymerizable unsaturated monomer is typically 10 mol % or less with respect to the total of the vinyl ester compound and the copolymerizable unsaturated monomer.

In addition, the modified PVA resin is, for example, a resin having a primary hydroxy group in a side chain thereof in which, for example, the number of primary hydroxy groups in the side chain is typically from 1 to 5, preferably 1 or 2, particularly preferably 1, and the resin preferably further has a secondary hydroxy group in addition to the primary hydroxy group. Examples of such modified PVA resin include a PVA resin having a hydroxyalkyl group in aside chain thereof and a PVA resin having a 1,2-diol structural unit in a side chain thereof. The PVA resin having a 1,2-diol structural unit in a side chain thereof may be produced by, for example: (i) a method involving saponifying a copolymer of vinyl acetate and 3,4-diacetoxy-1-butene; (ii) a method involving saponifying and decarboxylating a copolymer of vinyl acetate and vinyl ethylene carbonate; (iii) a method involving saponifying and deketalizing a copolymer of vinyl acetate and a 2,2-dialkyl-4-vinyl-1,3-dioxolane; or (iv) a method involving saponifying a copolymer of vinyl acetate and glycerin monoallyl ether.

A known polymerization method, such as a solution polymerization method, an emulsion polymerization method, or a suspension polymerization method, may be arbitrarily used as a polymerization method in the production of the PVA resin (A). However, the production is typically performed by a solution polymerization method involving using a lower alcohol, such as methanol, ethanol, or isopropyl alcohol, as a solvent. In the case of the modified PVA resin, such arbitrary methods as described below may each be used as a method of loading monomers in such solution polymerization method: a method involving loading the total amount of the vinyl ester compound and part of, for example, the unsaturated monomer having a carboxyl group first, initiating their polymerization, and adding the remaining unsaturated monomer in a continuous or divided manner during the period of the polymerization; and a method involving loading the unsaturated monomer having a carboxyl group in a lump.

Known polymerization catalysts, such as azo catalysts including azobisisobutyronitrile, and peroxide catalysts including acetyl peroxide, benzoyl peroxide, and lauroyl peroxide, may each be appropriately selected and blended in accordance with the polymerization method. In addition, the reaction temperature of the polymerization is selected from the range of from 50° C. to about the boiling point of the selected polymerization catalyst.

The saponification is performed in the presence of a saponification catalyst by dissolving the resultant polymer in an alcohol. Examples of the alcohol include alcohols each having 1 to 5 carbon atoms, such as methanol, ethanol, and butanol. Those alcohols may be used alone or in combination thereof. In addition, the concentration of the copolymer in the alcohol is selected from the range of from 20 wt. % to 50 wt. %.

For example, alkali catalysts, such as hydroxides and alcoholates of alkali metals including sodium hydroxide, potassium hydroxide, sodium methylate, sodium ethylate, and potassium methylate, may each be used as the saponification catalyst, and an acid catalyst may also be used. The usage amount of the saponification catalyst is preferably set to from 1 millimole equivalent to 100 millimole equivalents with respect to the vinyl ester compound. Those saponification catalysts may be used alone or in combination thereof.

The carboxyl group-modified PVA resin in the modified PVA resin may be produced by an arbitrary method, and examples thereof include: (I) a method involving copolymerizing an unsaturated monomer having a carboxyl group and a vinyl ester compound, and then saponifying the resultant copolymer; and (II) a method involving polymerizing the vinyl ester compound while causing, for example, an alcohol, aldehyde, or thiol having a carboxyl group to coexist as a chain transfer agent, and then saponifying the resultant polymer.

The above-mentioned compounds may each be used as the vinyl ester compound in the method (I) or (II). Of those, vinyl acetate is preferably used.

Examples of the unsaturated monomer having a carboxyl group in the method (I) include monomers, such as ethylenically unsaturated dicarboxylic acids (e.g., maleic acid, fumaric acid, and itaconic acid), ethylenically unsaturated dicarboxylic acid monoesters (e.g., maleic acid monoalkyl ester, fumaric acid monoalkyl ester, and itaconic acid monoalkyl ester), ethylenically unsaturated dicarboxylic acid diesters (e.g., maleic acid dialkyl ester, fumaric acid dialkyl ester, and itaconic acid dialkyl ester), provided that those diesters are each required to be transformed into a carboxyl group by hydrolysis at the time of saponification of the copolymer, ethylenically unsaturated carboxylic acid anhydrides (e.g., maleic anhydride and itaconic anhydride), and ethylenically unsaturated monocarboxylic acids (e.g., (meth)acrylic acid and crotonic acid), and salts thereof. Of those, maleic acid, the maleic acid monoalkyl ester, the maleic acid dialkyl ester, the maleic acid salt, maleic anhydride, itaconic acid, the itaconic acid monoalkyl ester, the itaconic acid dialkyl ester, (meth)acrylic acid, and the like are preferably used, maleic acid, the maleic acid monoalkyl ester, the maleic acid dialkyl ester, the maleic acid salt, and maleic anhydride are particularly preferably used, and the maleic acid monoalkyl ester is more preferably used. Those monomers may be used alone or in combination thereof.

In the method (II), a compound derived from a thiol, the compound having a particularly large chain transfer effect, is effective, and examples thereof include compounds represented by the following general formulae (1) to (3).

In the general formula (1), "n" represents an integer of from 0 to 5.

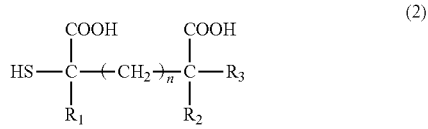

In the general formula (2), "n" represents an integer of from 0 to 5, and $R_1$, $R_2$, and $R_3$ each represent a hydrogen atom or a lower alkyl group (that may contain a substituent).

In the general formula (3), "n" represents an integer of from 0 to 20.

The examples also include salts of the compounds represented by the general formulae (1) to (3). Specific examples thereof include a mercaptoacetic acid salt, a 2-mercaptopropionic acid salt, a 3-mercaptopropionic acid salt, and a 2-mercaptostearic acid salt. Those compounds may be used alone or in combination thereof.

A method of producing the carboxyl group-modified PVA resin is not limited to the above-mentioned methods, and for example, a post-modification method involving causing a carboxyl group-containing compound having a functional group having reactivity with a hydroxy group, such as a dicarboxylic acid, an aldehyde carboxylic acid, or a hydroxycarboxylic acid, to post-react with a PVA resin (a partially saponified product or a completely saponified product) may also be performed.

In addition, when a sulfonic acid-modified PVA resin, which is modified with a sulfonic acid group, is used, the sulfonic acid-modified PVA resin may be produced by, for example, a method involving copolymerizing a copolymerizable component of a sulfonic acid, such as vinylsulfonic acid, styrenesulfonic acid, allylsulfonic acid, methallylsulfonic acid, or 2-acrylamido-2-methylpropanesulfonic acid, or a salt thereof, and a vinyl ester compound, and then saponifying the resultant copolymer, or a method involving subjecting, for example, vinylsulfonic acid or a salt thereof, or 2-acrylamido-2-methylpropanesulfonic acid or a salt thereof to Michael addition to a PVA resin.

Meanwhile, an example of the method involving post-modifying the unmodified PVA is a method involving subjecting the unmodified PVA to acetoacetic acid esterification, acetalization, urethanation, etherification, grafting, phosphoric acid esterification, or oxyalkylenation.

The polymerization may be performed by incorporating any other general monomer in addition to the unsaturated monomer having a carboxyl group and the vinyl ester compound to the extent that the water solubility of the resin to be obtained is not impaired, and for example, an alkyl ester of an ethylenically unsaturated carboxylic acid, an allyl ester of a saturated carboxylic acid, an α-olefin, an alkyl vinyl ether, an alkyl allyl ether, (meth)acrylamide, (meth)acrylonitrile, styrene, and vinyl chloride may each be used as such monomer. Those monomers may be used alone or in combination thereof.

In the present disclosure, the plasticizer (B) is preferably incorporated into the PVA resin (A) in terms of the impartment of flexibility to the water-soluble film of the present disclosure when a chemical agent package is produced by using the water-soluble film. Further, in terms of the bleed-out resistance of the film, it is important that at least the following three kinds be used in combination as the plasticizer (B).

Such plasticizer (B) contains the following three kinds: a polyhydric alcohol (b1) having a melting point of more than 50° C. and 100° C. or less (hereinafter sometimes abbreviated as "plasticizer (b1)"), a polyhydric alcohol (b2) having a melting point of 50° C. or less (hereinafter sometimes abbreviated as "plasticizer (b2)"), and a polyhydric alcohol (b3) having a melting point of more than 100° C. (hereinafter sometimes abbreviated as "plasticizer (b3)"). When those plasticizers are used as essential components, a particularly excellent effect is exhibited on the bleed-out resistance.

Examples of the polyhydric alcohol (b1) having a melting point of more than 50° C. and 100° C. or less (plasticizer (b1)) include trimethylolpropane (58° C.), salicyl alcohol (83° C.), threitol (88° C.), xylitol (92° C.), trehalose (97° C.), and sorbitol (95° C.). Of those, a sugar alcohol is particularly preferred. Those plasticizers may be used alone or in combination thereof. The melting point of each compound is shown in the parentheses.

Of the plasticizers (b1), a plasticizer having a melting point of 99° C. or less is preferred in terms of the maintenance of the strength of the film, and a plasticizer having a melting point of 97° C. or less is particularly preferred. The lower limit of the melting point is preferably 60° C., particularly preferably 70° C.

Further, in the present disclosure, the number of hydroxy groups in a molecule of the plasticizer (b1) is preferably 3 or more in terms of the water solubility of the water-soluble film, and is particularly preferably from 4 to 8, more preferably from 5 to 7. Suitable specific examples of the plasticizer satisfying such condition include sorbitol and xylitol.

In addition, in the present disclosure, the molecular weight of the plasticizer (b1) is preferably from 100 to 250 in terms of the maintenance of the tension of a package, and is particularly preferably from 130 to 220, more preferably from 160 to 200. Suitable specific examples of the plasticizer satisfying such condition include sorbitol and xylitol.

As the polyhydric alcohol (b2) having a melting point of 50° C. or less (plasticizer (b2)), most of aliphatic alcohols are applicable. Preferred examples thereof include: dihydric alcohols, such as ethylene glycol (−13° C.), diethylene glycol (−11° C.), triethylene glycol (−7° C.), propylene glycol (−59° C.), tetraethylene glycol (−5.6° C.), 1,3-propanediol (−27° C.), 1,4-butanediol (20° C.), 1,6-hexanediol (40° C.), tripropylene glycol, and polyethylene glycol having a molecular weight of 2,000 or less; and trihydric or higher alcohols, such as polypropylene glycol having a molecular weight of 2,000 or less (−31° C.), glycerin (18° C.), diglycerin, and triethanolamine (21° C.). Those plasticizers may be used alone or in combination thereof. The melting point of each compound is shown in the parentheses.

Of the plasticizers (b2), a plasticizer having a melting point of 30° C. or less is preferred in terms of the flexibility of the film, and a plasticizer having a melting point of 20° C. or less is particularly preferred. The lower limit of the melting point is typically −80° C., preferably −10° C., particularly preferably 0° C.

Further, in the present disclosure, the number of hydroxy groups in a molecule of the plasticizer (b2) is preferably 4 or less, and is particularly preferably 3 or less because the control of the flexibility near room temperature (25° C.) is facilitated. Specifically, glycerin is suitable as the plasticizer satisfying such condition.

In addition, in the present disclosure, the molecular weight of the plasticizer (b2) is preferably 100 or less because the control of the flexibility is facilitated, and is particularly preferably from 50 to 100, more preferably from 60 to 95. Specifically, glycerin and propylene glycol are each suitable as the plasticizer satisfying such condition.

Preferred examples of the polyhydric alcohol (b3) having a melting point of more than 100° C. (plasticizer (b3)) include: dihydric alcohols, such as catechol (105° C.), resorcinol (110° C.), hydroquinone (172° C.), bisphenol A (158° C.), bisphenol F (162° C.), and neopentyl glycol (127° C.); trihydric alcohols, such as phloroglucinol (218° C.); tetrahydric alcohols, such as erythritol (121° C.) and pentaerythritol (260° C.); pentahydric alcohols, such as arabitol (103° C.), fucitol (153° C.), glucose (146° C.), and fructose (104° C.); hexahydric alcohols, such as mannitol (166° C.) and inositol (225° C.); octahydric alcohols, such as lactitol (146° C.) and sucrose (186° C.); nonahydric alcohols, such as maltitol (145° C.); and decahydric or higher alcohols, such as maltotriitol (186° C.). Of those, a sugar alcohol is particularly preferred. Those plasticizers may be used alone or in combination thereof. The melting point of each compound is shown in the parentheses.

Of the plasticizers (b3), a plasticizer having a melting point of from 100° C. to 400° C. is preferred in terms of the bleed-out resistance, and a plasticizer having a melting point of from 110° C. to 300° C. is particularly preferred, a plasticizer having a melting point of from 140° C. to 250° C. is more preferred, and a plasticizer having a melting point of from 120° C. to 200° C. is still more preferred.

Further, in the present disclosure, the number of hydroxy groups in a molecule of the plasticizer (b3) is preferably 3 or more in terms of the plasticity of the water-soluble film, and is particularly preferably from 3 to 50, more preferably from 5 to 30, still more preferably from 7 to 20. A suitable specific example of the plasticizer satisfying such condition is maltitol.

In addition, in the present disclosure, the molecular weight of the plasticizer (b3) is preferably from 150 to 800 in terms of the maintenance of the tension of a package, and is particularly preferably from 200 to 600, more preferably from 250 to 500, still more preferably from 300 to 400. A suitable specific example of the plasticizer satisfying such condition is maltitol.

In the water-soluble film of the present disclosure, another plasticizer except the plasticizers (b1) to (b3) may also be used in combination to the extent that the effects of the present disclosure are not impaired. Examples of such other plasticizer include: alcohols, such as diethylene glycol monomethyl ether, cyclohexanol, and carbitol; ethers, such as dibutyl ether; carboxylic acids, such as stearic acid, oleic acid, linoleic acid, linolenic acid, sorbic acid, citric acid, and adipic acid; ketones, such as cyclohexanone; amines, such as monoethanolamine, triethanolamine, ethylenediamine, and an imidazole compound; and amino acids, such as alanine, glycine, aspartic acid, glutamic acid, histidine, lysine, and cysteine. Those plasticizers may be used alone or in combination thereof.

In the present disclosure, the content of the plasticizer (B) is preferably 25 parts by weight or more, particularly preferably from 27 parts by weight to 70 parts by weight, more preferably from 30 parts by weight to 60 parts by weight, still more preferably from 35 parts by weight to 50 parts by weight with respect to 100 parts by weight of the PVA resin (A). When such content of the plasticizer (B) is excessively small, in the case where a package is provided by packaging a liquid, such as a liquid detergent, with the water-soluble films, the tension of each of the water-soluble films tends to be impaired with time. When the content is excessively large, the mechanical strength of each of the films tends to be reduced.

The content of the plasticizer (b1) is preferably from 5 parts by weight to 50 parts by weight, particularly preferably from 10 parts by weight to 45 parts by weight, more preferably from 15 parts by weight to 40 parts by weight with respect to 100 parts by weight of the PVA resin (A).

When such content of the plasticizer (b1) is excessively large, the water-soluble film tends to be so hard as to be brittle under a low-humidity environment, and when the content is excessively small, the water-soluble film tends to be so soft that its blocking is liable to occur.

The content of the plasticizer (b2) is preferably from 3.5 parts by weight to 50 parts by weight, particularly preferably from 4 parts by weight to 40 parts by weight, more preferably from 4.5 parts by weight to 30 parts by weight with respect to 100 parts by weight of the PVA resin (A).

When such content of the plasticizer (b2) is excessively large, the water-soluble film tends to be so soft that its blocking is liable to occur, and when the content is excessively small, the water-soluble film tends to be brittle under a low-humidity environment.

The content of the plasticizer (b3) is preferably from 0.5 parts by weight to 10 parts by weight, particularly preferably from 0.7 parts by weight to 9.5 parts by weight, more preferably from 0.8 parts by weight to 9 parts by weight, still more preferably from 1 part by weight to 8 parts by weight with respect to 100 parts by weight of the PVA resin (A).

When such content of the plasticizer (b3) is excessively small, the bleed-out of the plasticizer (b2) tends to occur, and when the content is excessively large, the bleed-out of the plasticizer (b3) itself tends to occur.

The content ratio (b2/b1) of the plasticizer (b2) to the plasticizer (b1) is preferably from 0.13 to 20, particularly preferably from 0.15 to 17, more preferably from 0.2 to 15 in terms of weight ratio.

When the content ratio of the plasticizer (b2) to the plasticizer (b1) is excessively small, the bleed-out tends to be liable to occur, and when the content ratio of the plasticizer (b2) to the plasticizer (b1) is excessively large, the film tends to be excessively soft.

The content ratio (b1/b3) of the plasticizer (b1) to the plasticizer (b3) is preferably from 1 to 40, particularly preferably from 2 to 35, more preferably from 3 to 30 in terms of weight ratio.

When the content ratio of the plasticizer (b1) to the plasticizer (b3) is excessively small, the bleed-out of the plasticizer (b3) tends to be liable to occur, and when the content ratio of the plasticizer (b1) to the plasticizer (b3) is excessively large, the bleed-out of the plasticizer (b1) tends to be liable to occur.

The content ratio (b3/b2) of the plasticizer (b3) to the plasticizer (b2) is preferably from 0.1 to 4, particularly preferably from 0.15 to 3, more preferably from 0.2 to 2 in terms of weight ratio.

When the content ratio of the plasticizer (b3) to the plasticizer (b2) is excessively small, the tension of a package tends to fail to be maintained, and when the content ratio of the plasticizer (b3) to the plasticizer (b2) is excessively large, the film tends to be excessively hard.

Further, the total amount of the plasticizer (b1), the plasticizer (b2), and the plasticizer (b3) is preferably 70 wt. % or more, particularly preferably 80 wt. % or more, more preferably 90 wt. % or more with respect to the entirety of the plasticizer (B), and it is still more preferred that the entirety of the plasticizer (B) be formed only of the three kinds of plasticizers, that is, the plasticizers (b1) to (b3). When the total amount of such plasticizers (b1) to (b3) is excessively small, the mechanical strength of the water-soluble film tends to be reduced.

A filler (C), a surfactant (D), or the like may be further incorporated into the water-soluble film of the present disclosure as required.

The filler (C) to be used in the present disclosure is incorporated for the purpose of the blocking resistance of the water-soluble film. Specific examples thereof include an inorganic filler and an organic filler. Of those, the organic filler is preferred. In addition, the average particle diameter of the filler is preferably from 0.1 μm to 50 μm, particularly preferably from 0.5 μm to 40 μm. The average particle diameter may be measured with, for example, a laser diffraction-type particle size distribution-measuring apparatus.

The average particle diameter of the inorganic filler is preferably from 1 μm to 10 μm. When such average particle diameter is excessively small, the effect of the dispersibility of the water-soluble film in water tends to be small. When the average particle diameter is excessively large, at the time of the stretching of the water-soluble film in its forming processing, a pinhole tends to occur or its appearance tends to be poor.

Specific examples of the inorganic filler include talc, clay, silicon dioxide, diatomaceous earth, kaolin, mica, asbestos, gypsum, graphite, glass balloons, glass beads, calcium sulfate, barium sulfate, ammonium sulfate, calciumsulfite, calciumcarbonate, calcium carbonate whisker, magnesium carbonate, dawsonite, dolomite, potassium titanate, carbon black, glass fibers, alumina fibers, boron fibers, processed mineral fibers, carbon fibers, hollow carbon spheres, bentonite, montmorillonite, copper powder, sodium sulfate, potassium sulfate, zinc sulfate, copper sulfate, iron sulfate, magnesium sulfate, aluminum sulfate, aluminum potassium sulfate, ammonium nitrate, sodium nitrate, potassium nitrate, aluminum nitrate, ammonium chloride, sodium chloride, potassium chloride, magnesium chloride, calcium chloride, sodium phosphate, and potassium chromate. Those inorganic fillers may be used alone or in combination thereof.

The average particle diameter of the organic filler is preferably from 0.5 μm to 50 μm, particularly preferably from 1 μm to 40 μm, more preferably from 2 μm to 30 μm, still more preferably from 3 μm to 25 μm. When such average particle diameter is excessively small, cost for the formation of the water-soluble film tends to increase. When the average particle diameter is excessively large, at the time of the stretching of the water-soluble film in its forming processing, a pinhole tends to occur.

Examples of such organic filler include biodegradable resins, such as starch, a melamine resin, a polymethyl (meth)acrylate resin, a polystyrene resin, and a polylactic acid. A biodegradable resin, such as a polymethyl (meth) acrylate resin, a polystyrene resin, or starch, is particularly suitably used as the organic filler. Those fillers may be used alone or in combination thereof.

Examples of the starch include raw starches (e.g., corn starch, potato starch, sweet potato starch, wheat starch, cassava starch, sago starch, tapioca starch, sorghum starch, rice starch, legume starch, *pueraria* starch, bracken starch, *Nelumbo nucifera* starch, and water chestnut starch), physically modified starches (e.g., α-starch, fractionated amylose, and heat-moisture-treated starch), enzymatically modified starches (e.g., hydrolyzed dextrin, enzyme-decomposed dextrin, and amylose), chemically degraded starches (e.g., acid-treated starch, hypochlorous acid-oxidized starch, and dialdehyde starch), and chemically modified starch derivatives (e.g., esterified starch, etherified starch, cationized starch, and cross-linked starch). Of those, the raw starches, in particular, the corn starch or the rice starch is preferably used in terms of ease of availability and economic efficiency. Those starches may be used alone or in combination thereof.

The content of the filler (C) is preferably from 1 part by weight to 30 parts by weight, particularly preferably from 2 parts by weight to 25 parts by weight, more preferably from 2.5 parts by weight to 20 parts by weight with respect to 100 parts by weight of the PVA resin (A). When such content is excessively small, the blocking resistance of the water-soluble film tends to be reduced. When the content is excessively large, at the time of the stretching of the water-soluble film in its forming processing, a pinhole tends to occur.

The surfactant (D) to be used in the present disclosure is incorporated for the purpose of improving peelability from a cast surface at the time of the formation of the water-soluble film. Typical examples thereof include a nonionic surfactant, a cationic surfactant, and an anionic surfactant. Examples of the nonionic surfactant include polyoxyethylene nonyl phenyl ether, polyoxyethylene octyl nonyl ether, polyoxyethylene dodecyl phenyl ether, polyoxyethylene alkyl allyl ethers, polyoxyethylenesorbitan monolaurate, polyoxyethylene sorbitan monopalmitate, polyoxyethylene sorbitan monostearate, polyoxyethylene sorbitan monooleate, polyoxyalkylene alkyl ether phosphate monoethanolamine salts, and polyoxyethylene alkylamino ethers, such as polyoxyethylene laurylamino ether and polyoxyethylene stearylamino ether. Of those, the polyoxyalkylene alkyl ether phosphate monoethanolamine salts and polyoxyethylene laurylamino ether are suitable in terms of production stability. Those nonionic surfactants may be used alone or in combination thereof.

The content of such surfactant (D) is preferably from 0.01 parts by weight to 3 parts by weight, particularly preferably from 0.1 parts by weight to 2.5 parts by weight, more preferably from 0.5 parts by weight to 2 parts by weight with respect to 100 parts by weight of the PVA resin (A). When such content is excessively small, peelability between the cast surface of a film-forming apparatus and each of the formed water-soluble films tends to be reduced, which causes a reduction in productivity of the film. When the content is excessively large, problems such as a reduction in adhesive strength at the time of sealing to be performed in the case where the water-soluble films are formed into a package, tend to occur.

In the water-soluble film of the present disclosure, for example, another water-soluble polymer (e.g., sodium polyacrylate, polyethylene oxide, polyvinylpyrrolidone, dextrin, chitosan, chitin, methyl cellulose, or hydroxyethyl cellulose), a perfume, a rust inhibitor, a colorant, an extender, an antifoaming agent, a UV absorber, liquid paraffins, a fluorescent whitening agent, or a bitter component (e.g., denatonium benzoate) may be further incorporated to the extent that the object of the present disclosure is not inhibited. Those components may be used alone or in combination thereof.

In addition, in the water-soluble film of the present disclosure, an antioxidant is preferably blended in terms of the suppression of yellowing. Examples of such antioxidant include: sulfurous acid salts, such as sodium sulfite, potassium sulfite, calcium sulfite, and ammonium sulfite; tartaric acid; ascorbic acid; sodium thiosulfate; catechol; and Rongalite. Of those, the sulfurous acid salts are preferred, and sodium sulfite is particularly preferred. Those antioxidants may be used alone or in combination thereof. The blending amount of such antioxidant is preferably from 0.1 parts by weight to 10 parts by weight, particularly preferably from 0.2 parts by weight to 5 parts by weight, more preferably from 0.3 parts by weight to 3 parts by weight with respect to 100 parts by weight of the PVA resin (A).

The water-soluble film of the present disclosure may be obtained, for example, as described below. That is, a resin composition containing the PVA resin (A) and the plasticizer (B), and, as required, the filler (C), the surfactant (D), and the like is dissolved or dispersed in water to provide a film-forming raw material. Then, the film-forming raw material is formed into a film to provide the target water-soluble film. A method such as a melt extrusion method or a casting method may be adopted as a method for such film formation, and the casting method is preferred in terms of the accuracy of the thickness of the film.

The film formation based on the casting method is performed, for example, as described below. First, water is added to the PVA resin (A) (powder) to prepare a PVA resin aqueous solution, and the plasticizer (B) and, as required, a substance to be blended, such as the filler (C) or the surfactant (D), are added to the aqueous solution to provide an aqueous dispersion or aqueous solution of the resin composition. Alternatively, water is added to the resin composition containing the PVA resin (A) and the plasticizer (B), and various substances to be blended to provide the aqueous dispersion or aqueous solution of the resin composition.

The solid content concentration of such aqueous dispersion or aqueous solution of the resin composition is preferably from 10 wt. % to 50 wt. %, particularly preferably from 15 wt. % to 40 wt. %, more preferably from 20 wt. % to 35 wt. %. When such concentration is excessively low, the productivity of the water-soluble film tends to be reduced, and when the concentration is excessively high, the viscosity of the aqueous dispersion or the aqueous solution tends to be so high that the degassing of dope requires time or a die line occurs at the time of the formation of the water-soluble film. Further, when the temperature of the metal surface of an endless belt or a drum roll is excessively low, the drying of the aqueous dispersion or the aqueous solution tends to require time, and when the temperature is excessively high, foaming tends to occur in the aqueous dispersion or the aqueous solution at the time of the film formation.

Normal-temperature dissolution, high-temperature dissolution, pressure dissolution, or the like is typically adopted as a method of dissolving the resin composition. Of those, the high-temperature dissolution and the pressure dissolution are preferred because each of the methods produces a small amount of undissolved matter and is hence excellent in productivity. A dissolution temperature is typically from 80° C. to 100° C., preferably from 90° C. to 100° C. in the case of the high-temperature dissolution, and is typically from 80° C. to 130° C., preferably from 90° C. to 120° C. in the case of the pressure dissolution. A dissolution time is typically from 1 hour to 20 hours, preferably from 2 hours to 15 hours, particularly preferably from 3 hours to 10 hours. When the dissolution time is excessively short, the undissolved matter tends to remain, and when the dissolution time is excessively long, the productivity tends to be reduced.

In addition, in the dissolving step, a stirring blade is, for example, a paddle, FULLZONE, MAXBLEND, TWINSTAR, anchor, ribbon, or propeller stirring blade.

Further, after the dissolution, the resultant PVA resin aqueous solution is subjected to degassing treatment, and a method for such degassing is, for example, static degassing, vacuum degassing, or biaxial extrusion degassing. Of those, the static degassing or the biaxial extrusion degassing is preferred.

The static degassing is performed at a temperature of typically from 50° C. to 100° C., preferably from 70° C. to 95° C., and its degassing time is typically from 2 hours to 30 hours, preferably from 5 hours to 20 hours.

The film-forming raw material formed of the aqueous dispersion or the aqueous solution is passed through a slit, such as a T-die, is cast on a cast surface, such as the metal surface of an endless belt or a drum roll, or the surface of a plastic substrate, for example, a polyethylene terephthalate film, is dried, and is further subjected to heat treatment as required. Thus, the PVA water-soluble film of the present disclosure can be obtained.

For example, the film formation may be performed under film formation conditions described below.

The temperature of a portion configured to eject the aqueous dispersion or aqueous solution of the PVA resin composition is preferably from 60° C. to 98° C., particularly preferably from 70° C. to 95° C. When such temperature is excessively low, time for the drying tends to lengthen, which reduces the productivity of the water-soluble film. When the temperature is excessively high, foaming or the like tends to occur in the aqueous dispersion or the aqueous solution.

At the time of the film formation, a film formation speed is preferably from 3 m/min to 80 m/min, particularly preferably from 5 m/min to 60 m/min, more preferably from 8 m/min to 50 m/min.

In addition, the heat treatment may be performed with a heat roll, and floating, far-infrared ray treatment, and the like are also given as other examples of a method for the treatment. In particular, the heat treatment is preferably performed with the heat roll in terms of the productivity. A heat treatment temperature is preferably from 50° C. to 150° C., particularly preferably from 70° C. to 130° C., and a heat treatment time is preferably from 1 second to 60 seconds, particularly preferably from 3 seconds to 50 seconds, more preferably from 5 seconds to 40 seconds.

In addition, the PVA film may be obtained by: casting the aqueous dispersion or aqueous solution of the resin composition on a plastic substrate, such as a polyethylene terephthalate film or a polyethylene film, or a metal substrate with an applicator; and drying the aqueous dispersion or the aqueous solution.

The thickness of the PVA water-soluble film, which is appropriately selected in accordance with its applications and the like, is preferably from 10 µm to 120 µm, particularly preferably from 30 µm to 110 µm, more preferably from 45 µm to 100 µm. When such thickness is excessively small, the mechanical strength of the PVA film tends to be reduced. When the thickness is excessively large, the rate at which the water-soluble film is dissolved in water tends to be reduced, and the efficiency of film formation also tends to be reduced.

The width of the PVA water-soluble film, which is also appropriately selected in accordance with the applications and the like, is preferably from 300 mm to 5,000 mm, particularly preferably from 500 mm to 4,000 mm, more preferably from 800 mm to 3,000 mm. When such width is excessively small, the production efficiency of the film tends to be reduced, and when the width is excessively large, it tends to be difficult to control the sagging or thickness of the film.

The length of the PVA water-soluble film, which is also appropriately selected in accordance with the applications and the like, is preferably from 500 m to 20,000 m, particularly preferably from 800 m to 15,000 m, more preferably from 1,000 m to 10,000 m. When such length is excessively small, labor tends to be required in the switching of the film. When the length is excessively large, the appearance of the film tends to be poor owing to its tight winding, or the weight thereof tends to be excessively heavy.

In addition, the surface of the PVA water-soluble film may be plain, but in terms of the blocking resistance of the film, the slidability thereof at the time of its processing, the alleviation of adhesiveness between the films serving as products, and the appearance thereof, it is preferred that one surface or both surfaces of the PVA water-soluble film be subjected to texturing processing for imparting, for example, an embossed pattern, a fine uneven pattern, or a special engraving design.

At the time of such texturing processing, a processing temperature is typically from 60° C. to 150° C., preferably from 80° C. to 140° C. A processing pressure is typically from 2 MPa to 8 MPa, preferably from 3 MPa to 7 MPa. A processing time is typically from 0.01 seconds to 5 seconds, preferably from 0.1 seconds to 3 seconds, though the processing time varies depending on the processing pressure and the film formation speed.

In addition, cooling treatment may be performed after the texturing processing treatment as required for preventing unintentional stretching of the film due to heat.

In addition, in the present disclosure, the water content of the resultant PVA water-soluble film is preferably from 3 wt. % to 15 wt. % in terms of its mechanical strength and sealability, and is particularly preferably from 5 wt. % to 14 wt. %, more preferably from 6 wt. % to 13 wt. %. When such water content is excessively low, the film tends to be excessively hard, and when the water content is excessively high, its blocking tends to be liable to occur. The adjustment of the water content to such value may be achieved by appropriately setting a drying condition and a humidification condition.

The water content is measured in conformity with JIS K 6726 3.4, and the value of the resultant volatile content is defined as the water content.

In the present disclosure, the film formation is preferably performed under an environment at, for example, from 10° C. to 35° C., in particular, from 15° C. to 30° C. The humidity at which the film formation is performed is typically 70% RH or less.

In the present disclosure, the resultant PVA water-soluble film may be wound around a core pipe (S1) to provide a film roll. Although the resultant film roll may be supplied as it is as a product, the film is preferably wound around a core pipe (S2) having a length commensurate with a film width of a desired size to be supplied as a film roll.

The core pipe (S1) around which the film is wound is cylindrical, and a metal, a plastic, or the like may be appropriately selected as a material therefor, but the metal is preferred in terms of the fastness and strength of the core pipe.

The inner diameter of the core pipe (S1) is preferably from 3 cm to 30 cm, more preferably from 10 cm to 20 cm.

The wall thickness of the core pipe (S1) is preferably from 1 mm to 30 mm, more preferably from 2 mm to 25 mm.

The length of the core pipe (S1) needs to be made longer than the width of the film, and the core pipe is preferably made to protrude from each of the end portions of the film roll by from 1 cm to 50 cm.

In addition, the core pipe (S2) is cylindrical, and paper, a metal, a plastic, or the like may be appropriately selected as a material therefor, but the paper is preferred in terms of a reduction in weight of the core pipe and the handling thereof.

The inner diameter of the core pipe (S2) is preferably from 3 cm to 30 cm, more preferably from 10 cm to 20 cm.

The wall thickness of the core pipe (S2) is preferably from 1 mm to 30 mm, more preferably from 3 mm to 25 mm.

The length of the core pipe (S2) only needs to be a length equal to or longer than the PVA film width of a product, and is preferably equal to or longer than the width by up to 50 cm.

The PVA water-soluble film is slit into a desired width when wound around the core pipe (S2).

At the time of such slitting, the film is slit with a shear blade, a razor blade, or the like, but is preferably slit with the shear blade in terms of the smoothness of a slit section.

In the present disclosure, the resultant PVA water-soluble film wound in a roll shape (the film in the state is hereinafter referred to as "fill roll") is preferably packaged with a cover film formed of a resin having a water vapor barrier property. Such cover film is not particularly limited, but a cover film having a moisture permeability of 10 g/m$^2$·24 hr (measured in conformity with JIS Z 0208) or less may be used. The cover film is specifically, for example, a single-layer film made of a high-density polyethylene, a low-density polyethylene, a polypropylene, a polyester, a polyvinylidene chloride-coated polypropylene, a glass-deposited polyester, or the like, or a laminated film thereof, or a laminated film thereof with a split cloth, paper, or a nonwoven fabric. Examples of the laminated film include: a laminated film of a glass-deposited polyester and a polyethylene; and a laminated film of a polyvinylidene chloride-coated polypropylene and a polyethylene.

Such cover film is preferably subjected to antistatic treatment in terms of the prevention of the inclusion of foreign matter, and such antistatic agent may be kneaded into the film or its surface may be coated with the agent. When the antistatic agent is kneaded into the film, the agent is used in an amount of from about 0.01 wt. % to about 5 wt. % with respect to the resin forming the film, and when the surface is coated with the agent, the agent is used in an amount of from about 0.01 g/m$^2$ to about 1 g/m$^2$.

For example, an alkyl diethanolamine, a polyoxyethylene alkylamine, a higher fatty acid alkanolamide, or a sorbitan fatty acid ester is used as the antistatic agent.

Next, the film roll packaged with the cover film is preferably further packaged with a packaging film formed of an aluminum material. Examples of such packaging film include an aluminum foil, a laminated film of an aluminum foil and a moisture-resistant plastic film (e.g., a laminated film of an aluminum foil and a polyethylene film), a laminated film of an aluminum-deposited film and a moisture-resistant plastic film (e.g., a laminated film of an aluminum-deposited polyester film and a polyethylene film), and a laminated film of an alumina-deposited film and a moisture-resistant plastic film (e.g., a laminated film of an alumina-deposited polyester film and a polyethylene film). In particular, in the present disclosure, a laminated film of an aluminum foil and a polyolefin film, or a laminated film of an aluminum-deposited film and a polyolefin film is useful, and a laminated film having a structure of a stretched polypropylene film/a polyethylene film/an aluminum foil/a polyethylene film, a laminated film having a structure of a stretched polypropylene film/a low-density polyethylene film/an aluminum foil, or the like is particularly useful.

At the time of the packaging, it is sufficient that the film roll be sequentially packaged with the cover film formed of the resin having a water vapor barrier property serving as an inner side and the packaging film formed of the aluminum material serving as an outer side, and margins of the films in their width directions be pushed into the core pipe.

In order that flaws in the end portions of the film roll of the present disclosure and the adhesion of foreign matter, such as dust, thereto may be prevented, protective pads having core pipe through-holes may be mounted on both end portions of the film roll directly or after the film roll has been packaged with the packaging film.

A practical shape of each of the protective pads is a disc-shaped sheet or film so as to conform to the film roll. A buffer function based on, for example, a foam, a fabric shape, or a nonwoven fabric shape is desirably imparted to each of the pads for making their protective effects significant. In addition, a desiccant may be separately incorporated into the film roll, or may be laminated on or mixed in each of the protective pads for protecting the film roll from moisture.

An advantageous material for each of the protective pads is a plastic, and specific examples thereof include a polystyrene, a polyethylene, a polypropylene, a polyester, and a polyvinyl chloride.

In addition, examples of the protective pad containing the desiccant include: a moisture-absorbing layer obtained by dispersing or impregnating a desiccant or a water-absorbing agent, such as calcium chloride, silica gel, a molecular sieve, a saccharide, in particular, a saccharide having a high osmotic pressure, or a water-absorbing resin, in a formable material, such as a natural cellulose, a synthetic cellulose, a glass cloth, or a nonwoven fabric, or applying the desiccant or the water-absorbing agent to the material, and drying the material having dispersed or impregnated therein, or applied thereto the desiccant or the water-absorbing agent; and a product obtained by sandwiching such desiccant or water-absorbing agent between the formable materials or thermoplastic resin films, such as a polyester film, a polyethylene film, a polypropylene film, and a Teflon (trademark) film.

As examples of a commercially available sheet-shaped desiccant, there are given "I.D. SHEET" manufactured by ID Corporation, "ALLOSHEET" and "ZEOSHEET" manufactured by Shinagawa Chemical Industry Co., Ltd., and "HI-SHEET DRY" manufactured by Hi-Sheet Industries.

The film roll packaged with such means is preferably stored or transported under a so-called air-floating state without being in contact with the ground by being supported through the arrangement of brackets (support plates) at protruding portions at both ends of the core pipe or the mounting of the protruding portions at both ends on stands. When the width of the film is relatively small, the brackets are used, and when the width of the film is relatively large, the stands are used.

Each of the brackets is formed of plywood or a plastic plate, and its size only needs to be such that the four sides of the bracket are larger than the diameter of the film roll.

Then, a pair of the brackets is arranged on the film roll as follows: the brackets are vertically placed at the core pipe-protruding portions at both ends of the film roll so as to face each other, and are fitted thereinto. The fitting may be performed by arranging a bored hole somewhat larger than the diameter of the core pipe in the central portion of each of the brackets or boring a range from the upper portion of each of the brackets to the central portion thereof in a U-shaped manner so that the core pipe may be easily inserted.

The film roll supported with the brackets is stored or transported after having been accommodated in a carton, such as a cardboard box. However, in order that the operation at the time of the accommodation may be smoothly performed, when rectangular brackets are used, the four corners of each of the brackets are preferably cut off.

In addition, it is advantageous to fix both the brackets with a binding tape so that the pair of brackets may not wobble, and at the time, it is practical to arrange a tape shift-preventing groove comparable in size to the width of the tape on a side surface (thickness portion) of each of the brackets so that the movement or sagging of the tape may not occur.

At the time of the storage or transportation of the packaged film roll, an extremely high temperature condition, an extremely low temperature condition, an extremely low humidity condition, and an extremely high humidity condition are desirably avoided. Specifically, a temperature of from 10° C. to 30° C. and a humidity of from 40% RH to 75% RH are desirable.

The water-soluble film of the present disclosure obtained as described above can be provided in various forms. In addition, its applications are not particularly limited, but the film is useful in, for example, various packaging applications out of the applications, and is particularly useful in an application where a chemical agent or the like is packaged as a unit. The chemical agent is not particularly limited, and may be any one of an alkaline chemical agent, a neutral chemical agent, and an acidic chemical agent. The shape of the chemical agent may be any one of shapes such as a granule, a tablet, a powder, and a liquid. The film is particularly useful in packaging a liquid chemical agent, such as a liquid detergent, to be used by being dissolved or dispersed in water.

The pH value of the liquid chemical agent when dissolved or dispersed in water is preferably from 6 to 12, particularly preferably from 7 to 11, and the water content of the liquid chemical agent is preferably 15 wt. % or less, particularly preferably from 0.1 wt. % to 10 wt. %, more preferably from 0.1 wt. % to 7 wt. %. When the conditions are satisfied, the film does not gel or become insoluble, and is hence excellent in water solubility.

The pH value is measured in conformity with JIS K 3362 8.3. In addition, the water content is measured in conformity with JIS K 3362 7.21.3.

Examples of the liquid chemical agent include liquid chemical agents to be used for, for example, various kinds of washing, such as the laundry of clothing and the like, and the washing of eating utensils and the like, sterilization, and surface finish. Specific examples thereof include a liquid detergent, a fabric softener, an aromatic finishing agent, and a bleaching/sterilizing agent. The water-soluble film is suitably used for the liquid detergent out of those described above.

<Chemical Agent Package>

A chemical agent package of the present disclosure includes a package bag formed of the water-soluble film, and a liquid chemical agent included in the package bag. In addition, the chemical agent package is configured as follows: the chemical agent package holds such a shape as to include the liquid chemical agent therein at the time of its conveyance or storage; and at the time of its use (e.g., at the time of laundry), the package bag formed of the water-soluble film is brought into contact with water to be dissolved therein, and the liquid chemical agent included therein flows out and diffuses into the water, and hence the chemical agent is brought into contact with an object to exhibit its chemical effect.

With regard to the size of the chemical agent package of the present disclosure, its length is typically from 10 mm to 50 mm, preferably from 20 mm to 40 mm. In addition, the film thickness of the package bag formed of the water-soluble film is typically from 10 µm to 120 µm, preferably from 15 µm to 110 µm, particularly preferably from 20 µm to 100 µm. The amount of the liquid chemical agent to be included in the package bag is typically from 5 mL to 50 mL, preferably from 10 mL to 40 mL.

In addition, the outer surface of the package bag (water-soluble film) serving as the surface of the chemical agent package of the present disclosure is preferably subjected to texturing processing for imparting, for example, an embossed pattern, a fine uneven pattern, or a special engraving design in terms of the blocking resistance of the chemical agent package, the slidability thereof at the time of its processing, the alleviation of adhesiveness between the products (packages), and the appearance thereof, but the surface may be smooth.

When the package is provided by packaging the liquid chemical agent with the water-soluble film of the present disclosure, a known method may be adopted. For example, first, the water-soluble film is mounted on a die in which many recessed portions are arranged, and the die is heated to high temperature (e.g., from 50° C. to 60° C.) to soften the water-soluble film. Then, the water-soluble film is formed into an uneven shape along the respective recessed portions by vacuum forming. After that, the liquid chemical agent weighed in a predetermined amount is filled into each recessed portion of the water-soluble film, and another water-soluble film is superimposed thereon. Then, the openings of the respective recessed portions are sealed. Thus, an intermediate formed article having hermetically sealed therein predetermined amounts of the liquid chemical agent is obtained. Then, the intermediate formed article is removed from the die, and is cut into individual pieces. Thus, a chemical agent package of a unit packaging type can be obtained.

A method involving superimposing the water-soluble films to seal the openings is, for example, water sealing involving using water, or adhesive sealing involving using an adhesive in addition to the heat sealing involving sealing the openings under a state in which at least one of the water-soluble films is heated to be softened. Of those, a method based on the water sealing involving using water is versatile and advantageous.

EXAMPLES

The present disclosure is more specifically described by way of Examples. The present disclosure is not limited to Examples below without departing from the gist of the present disclosure.

The terms "part(s)" and "%" in the examples are on a weight basis.

The following PVA resins were prepared as the PVA resin.
Carboxyl group-modified PVA (A1): 4% aqueous solution viscosity at 20° C.: 22 mPa·s, average saponification degree: 94 mol %, modification amount with maleic acid monomethyl ester: 2.0 mol %
Unmodified PVA (A2): 4% aqueous solution viscosity at 20° C.: 18 mPa·s, average saponification degree: 88 mol %

The following plasticizers were prepared as the plasticizer.
Sorbitol (b1)
Glycerin (b2)
Maltitol (b3)

Example 1

90 Parts of the carboxyl group-modified PVA (A1) and 10 parts of the unmodified PVA (A2) serving as the PVA resin (A), 34 parts of the sorbitol (b1), 5 parts of the glycerin (b2), and 1 part of the maltitol (b3) serving as the plasticizer (B), 8 parts of starch (average particle diameter: 20 µm) serving as the filler (C), 2 parts of a polyoxyalkylene alkyl ether phosphate monoethanolamine salt serving as the surfactant (D), and water were mixed, and the mixture was subjected to dissolution treatment to provide a PVA aqueous solution having dispersed therein the starch (solid content concentration: 25%).

The resultant PVA aqueous solution was degassed at 80° C., and was cooled to 40° C. The PVA aqueous solution was cast on a polyethylene terephthalate (PET) film, and the resultant was passed through the inside of a 3-meter drying chamber (105° C.) at a speed of 0.350 m/min to be dried. Thus, a PVA film (water-soluble film) having a thickness of 89 μm was obtained.

The PVA film obtained in the foregoing was subjected to the following evaluation. The result of the evaluation is shown in Table 1 to be described later.

[Bleed-Out Resistance]

The PVA film formed on the PET film was shaped into a film measuring 25 cm long by 20 cm wide without being peeled from the PET film. The film thus obtained was defined as 1 film, and 8 films of such kind were superimposed on each other so that the PVA film, the PET film, the PVA film, and the PET film were arranged in the stated order from above. The superimposed films were loaded into a zipper bag (measuring 30 cm long by 25 cm wide). The films were stored under the conditions of room temperature (20° C.±15° C.) and normal humidity (45% RH to 85% RH) for 4 months under a state in which the lid of the zipper bag was opened. After that, the states of the films were visually observed and evaluated by the following criteria.

○No whitening of the films was observed, and no bleed-out was observed.

x . . . The bleed-out of a solid, a liquid, or the like was observed, and the films whitened.

Examples 2 and 3, and Comparative Example 1

PVA films (water-soluble films) were each obtained in the same manner as in Example 1 except that the respective blending components were changed as shown in Table 1.

The resultant PVA films (water-soluble films) were each subjected to the same evaluation as that of Example 1.

The results of the evaluation of Examples and Comparative Example are shown in Table 1 below.

TABLE 1

| | | | (Part(s) by weight) | | | |
|---|---|---|---|---|---|---|
| | | | Example 1 | Example 2 | Example 3 | Comparative Example 1 |
| PVA film (water-soluble film) | PVA resin (A) | Carboxyl group-modified PVA (A1) | 90 | 90 | 90 | 90 |
| | | Unmodified PVA (A2) | 10 | 10 | 10 | 10 |
| | Plasticizer (B) | Sorbitol (b1) | 34 | 32 | 27 | 35 |
| | | Glycerin (b2) | 5 | 5 | 5 | 5 |
| | | Maltitol (b3) | 1 | 3 | 8 | — |
| | Thickness | | 89 μm | 90 μm | 91 μm | 87 μm |
| Bleed-out resistance | | | ○ | ○ | ○ | x |

As can be seen from the results of Table 1 described above, while the water-soluble films of Examples in each of which the specific three kinds of plasticizers (b1) to (b3) having different melting points were used in combination as the plasticizer (B) were each excellent in bleed-out resistance, the water-soluble film of Comparative Example in which the plasticizer (b3) was not used and only the other two kinds were used as the plasticizer (B) was poor in bleed-out resistance. It is found from such results that, even when the water-soluble films of Examples are each turned into a package by packaging, for example, a liquid detergent, no bleed-out occurs, and hence the package can be satisfactorily produced and the resultant package serves as a satisfactory package that shows a small change with time.

Specific modes in the present disclosure have been described in Examples described above, but Examples described above are merely illustrative and should not be construed as being limitative. Various modifications apparent to a person skilled in the art are meant to fall within the scope of the present disclosure.

The water-soluble film of the present disclosure is a water-soluble film that has excellent water solubility, that has excellent mechanical characteristics, such as a high tensile strength and a high tensile elongation, and that does not cause bleed-out before the formation of a package. Accordingly, the film can be used in various packaging applications, and is particularly useful in an application where a chemical agent or the like is packaged as a unit.

The invention claimed is:

1. A water-soluble film, comprising:
   a polyvinyl alcohol resin (A);
   a plasticizer (B), and
   a filler (C),
   wherein the plasticizer (B) contains
   a polyhydric alcohol (b1) having a melting point of more than 50° C. and 100° C. or less,
   a polyhydric alcohol (b2) having a melting point of 50° C. or less, and
   a polyhydric alcohol (b3) having a melting point of more than 100° C.;
   wherein a content of the filler (C) is from 1 part by weight to 30 parts by weight with respect to 100 parts by weight of the polyvinyl alcohol resin (A); and
   wherein the water-soluble film has a water content of from 3 wt. % to 15 wt. %.

2. The water-soluble film according to claim 1, wherein the polyvinyl alcohol resin (A) comprises an anionic group-modified polyvinyl alcohol resin.

3. The water-soluble film according to claim 1, wherein the polyvinyl alcohol resin (A) comprises
   an anionic group-modified polyvinyl alcohol resin and
   an unmodified polyvinyl alcohol.

4. The water-soluble film according to claim 1, wherein a content of the plasticizer (B) is 25 parts by weight or more with respect to 100 parts by weight of the polyvinyl alcohol resin (A).

5. The water-soluble film according to claim 1, wherein a weight content ratio (b1/b3) of the polyhydric alcohol (b1) having a melting point of more than 50° C. and 100° C. or less to the polyhydric alcohol (b3) having a melting point of more than 100° C. is from 1 to 40.

6. The water-soluble film according to claim 1, wherein the water-soluble film is capable of being used for chemical agent packaging.

7. The water soluble film according to claim 1, wherein the water-soluble film has a water content of from 5 wt. % to 15 wt. %.

8. The water soluble film according to claim 7, wherein the water-soluble film has a water content of from 6 wt. % to 13 wt. %.

9. The water-soluble film according to claim 1, wherein polyhydric alcohol (b1) is selected from the group consisting of trimethylolpropane, salicyl alcohol, threitol, xylitol, trehalose, and sorbitol.

10. The water-soluble film according to claim 1, wherein polyhydric alcohol (b2) is selected from the group consisting of ethylene glycol, diethylene glycol, triethylene glycol, propylene glycol, tetraethylene glycol, 1,3-propanediol, 1,4-butanediol, 1,6-hexanediol, tripropylene glycol, polyethylene glycol having a molecular weight of 2,000 or less, polypropylene glycol having a molecular weight of 2,000 or less, glycerin, diglycerin, and triethanolamine.

11. The water-soluble film according to claim 1, wherein polyhydric alcohol (b3) is selected from the group consisting of catechol, resorcinol, hydroquinone, bisphenol A, bisphenol F, neopentyl glycol, phloroglucinol, erythritol, pentaerythritol, arabitol, fucitol, glucose, fructose, mannitol, inositol, lactitol, sucrose, maltitol, and maltotriitol.

12. The water-soluble film according to claim 9, wherein polyhydric alcohol (b1) is selected from the group consisting of sorbitol and xylitol.

13. The water-soluble film according to claim 10, wherein polyhydric alcohol (b2) is selected from the group consisting of glycerin and propylene glycol.

14. The water-soluble film according to claim 11, wherein polyhydric alcohol (b3) is selected from the group consisting of mannitol and maltitol.

15. The water-soluble film according to claim 1, wherein polyhydric alcohol (b1) is selected from the group consisting of sorbitol and xylitol; polyhydric alcohol (b2) is selected from the group consisting of glycerin and propylene glycol; and polyhydric alcohol (b3) is selected from the group consisting of mannitol and maltitol.

16. The water-soluble film according to claim 1, wherein polyhydric alcohol (b1) comprises trimethylolpropane, sorbitol, xylitol, or combinations thereof; polyhydric alcohol (b2) comprises 1,3-propanediol, ethylene glycol, diethylene glycol, triethylene glycol, propylene glycol, tetraethylene glycol, tripropylene glycol, polyethylene glycol having a molecular weight of 2,000 or less, polypropylene glycol having a molecular weight of 2,000 or less, glycerin, diglycerin, or combinations thereof; and polyhydric alcohol (b3) comprises neopentyl glycol, mannitol, maltitol, or combinations thereof.

17. A chemical agent package, comprising:
a package bag comprising a plurality of water-soluble films of claim 1 bonded to each other; and
a liquid chemical agent included in the package bag.

18. The chemical agent package according to claim 17, wherein the liquid chemical agent shows a pH value of from 6 to 12 when dissolved or dispersed in water, and the liquid chemical agent has a water content of 15 wt. % or less.

19. A water-soluble film, comprising:
a polyvinyl alcohol resin (A) comprising an anionic group-modified polyvinyl alcohol resin and an unmodified polyvinyl alcohol; and
a plasticizer (B), wherein the plasticizer (B) contains
a polyhydric alcohol (b1) having a melting point of more than 50° C. and 100° C. or less,
a polyhydric alcohol (b2) having a melting point of 50° C. or less, and
a polyhydric alcohol (b3) having a melting point of more than 100° C.

* * * * *